Patented Jan. 14, 1947

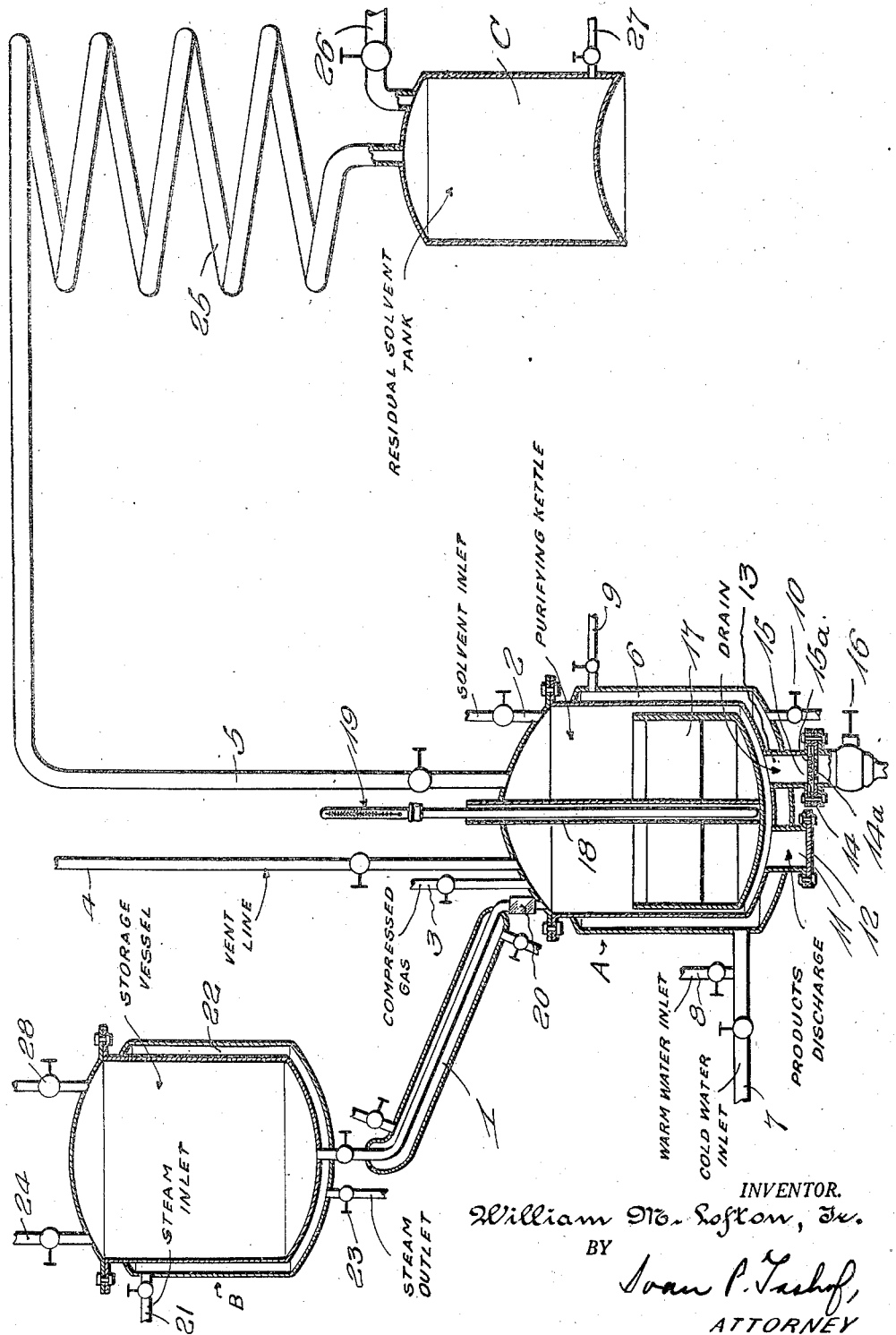

2,414,418

UNITED STATES PATENT OFFICE 2,414,418

METHOD OF PURIFYING CHLORACETOPHENONE

William M. Lofton, Jr., Butler, Pa., assignor to Pennsylvania Coal Products Company, Petrolia, Pa., a corporation of Pennsylvania Application July 2, 1943, Serial No. 493,267

8 Claims. (Cl. 260—592)

This invention relates to the purification of chloracetophenone in a simple, efficient and economical manner. Alpha-chloracetophenone, a well known lachrymator, is usually manufactured by reacting chloracetylchloride with benzol in the presence of anhydrous aluminum chloride. After drowning the reaction mixture in water, the benzol layer is distilled to remove benzol. The chloracetophenone remaining is then either distilled under reduced pressure, or it may be distilled with steam. Using either procedure, further processing of the reaction mass is necessary to obtain chloracetophenone in pure form. However, the purification steps usually involve further handling, which is objectionable due to the irritating effect produced by the chloracetophenone on the eyes, skin and upper respiratory tracts. For example, if after removing the benzol, the chloracetophenone is distilled with steam, the distillate consists of a mixture of water and chloracetophenone, said distillate usually being cooled and stirred in such a manner as to produce a slurry of chloracetophenone crystals in water. The crystals may be separated in any suitable manner by filtering or centrifuging. Thereafter, the resulting moist crystals, due to their low melting point, may be dried at a comparatively low temperature under vacuum. These operations are highly disagreeable because of the extremely irritating character of the product, and furthermore, removal of the moisture content of the chloracetophenone may be far from complete and on storage the material may develop substantial amounts of free hydrochloric acid which causes corrosion of metal containers and discoloration of the chloracetophenone.

If the product is distilled under vacuum, the above objections are largely eliminated, because the product is practically anhydrous and little if any exposure of operating personnel to the product is involved. However, the so produced chloracetophenone is usually contaminated with various amounts of hydrogen chloride, and a small percentage of acetophenone. Therefore, further purification is necessary in order to remove these impurities, as otherwise the product contains hydrogen chloride, which is objectionable for the reasons above set forth, and acetophenone, the presence of which is objectionable in the finally produced chloracetophenone, because it renders the latter oily and prevents it from flowing freely.

It has been proposed to recrystallize the chloracetophenone containing the impurities from an organic solvent such as benzol or methanol. This produces a fairly satisfactory product, but involves exposure of personnel to the irritating action of the chloracetophenone, and furthermore requires considerable equipment such as dissolving vessels, filters or centrifuges, suitable drying chambers, usually operating under vacuum. Furthermore, the use of this equipment under necessary operating conditions is frequently hazardous in addition to being disagreeable.

The primary object of the present invention is to provide a method and apparatus in which the above disadvantages are substantially eliminated.

Still a further object of the present invention is to provide a method which is simple, efficient and may be operated with a minimum of inexpensive equipment.

Another object of the present invention is to provide a method of producing chloracetophenone of high purity.

Other objects will become apparent from the following disclosure.

In accordance with the present invention, the chloracetophenone containing impurities including hydrogen chloride and acetophenone is treated with an organic medium in which the chloracetophenone is insoluble or only slightly soluble, but in which the acetophenone is highly soluble, so that it is substantially completely removed from the chloracetophenone. Stated differently, the chloracetophenone is treated with an organic medium which is a solvent of the impurities and a non-solvent of the chloracetophenone. This separation is effected under the special conditions hereinafter set forth.

While it is preferred to use paraffin hydrocarbons as the organic solvent or treatment medium, other solvents which may be used are the aromatic hydrocarbons, including benzol, toluol, homologues thereof, and the alcohols including the lower alcohols such as methyl or ethyl alcohols. However, these solvents give less satisfactory results than the paraffin or aliphatic saturated or unsaturated hydrocarbons, chiefly because they have a much greater solvent action on the chloracetophenone than the paraffin hydrocarbons, thereby requiring that a substantially greater amount of the chloracetophenone be recycled. This likewise applies to the chlorinated hydrocarbons typified by ethylene chloride, monochlorbenzene, carbon tetrachloride and the like. The olefin hydrocarbons, and especially those that are normally liquid at atmospheric pressure and a temperature varying between about 50° F. to 120° F., may be used. For example, olefin hydrocarbons such as 2,4,4-trimethylpentene-2, or a mixture thereof with 2,4,4-trimethylpentene-1, as well as the heptenes and hexenes, or the higher members, such as 2,3,3,4-tetramethylpentene-1, boiling at 134° C., and 2,5-dimethylheptene-2, boiling at 137° C., of this series may be used as the solvent medium to effect the separation of impurities from chloracetophenone, but, in general, the use of these solvents which are normally liquid at atmospheric pressure and at the temperature set forth, is less desirable because of possible reactions between the chloracetophenone or of one of its impurities with the purifying solvent medium.

In the preferred form of the present invention, the paraffin hydrocarbons are used, since they are practically inert under the conditions of use, may be recovered and used a number of times, produce chloracetophenone of excellent quality, and dissolve only negligible amounts of chloracetophenone, thereby reducing recycling to a minimum, while at the same time almost quantitatively removing the impurities present.

The solvent medium may be a naphtha, as for example a relatively pure hydrocarbon such as normal hexane, or it may consist of a mixture of hexanes or other paraffin hydrocarbons. While it is not desired to be limited to hexanes or hydrocarbons having any specific number of carbon atoms, it is preferred to work with hydrocarbons, the boiling points of which are not too high, as the higher the boiling point, the more difficult it becomes to remove traces of the solvent from the chloracetophenone. In general, it is preferred to use hydrocarbons which are normally liquid at atmosphereic pressure and ordinary temperature, that is, a temperature in the neighborhood of about 45 to 120° F. However, the present invention may be carried out at pressures above atmospheric, and then organic solvent purification media may be used, including the paraffin hydrocarbons which are normally gaseous. Very satisfactory results have been obtained using hydrocarbons, the boiling points of which do not exceed about 127° C., and particularly good results are obtained using a petroleum distillate boiling between about 43° C. and about 121° C. The olefin compounds coming within this boiling range, and particularly olefin petroleum distillates may be used.

The present invention may be carried out in the apparatus shown in the accompanying drawing.

Referring to the drawing, there is provided a kettle A adapted to receive chloracetophenone, preferably in a molten state, from a jacketed steam heated storage vessel B. Operatively connected to the purifying kettle A is a residual solvent tank C. Connecting the storage vessel B with the purifying kettle A is a steam heated delivery conduit, 1, through which molten chloracetophenone passes. The purifying solvent is introduced into the kettle B through the solvent inlet member 2. The kettle A is provided with a compressed gas inlet conduit 3, a vent pipe 4; and a residual solvent exit vacuum conduit 5. Surrounding a major portion of the kettle A is a water jacket 6, provided with a cold water inlet 7, warm water inlet 8, and exit conduits 9 and 10. The purified chloracetophenone is removed from the kettle A through the products discharge conduit 11 having a removable closure member 12. A major portion of the solvent may be drained from the chloracetophenone through the drain 13 in which is mounted on the support 14 a fine mesh screen 15, which allows the solvent to pass therethrough while retaining thereon particles of chloracetophenone. The support 15 is provided with holes 14a, which are somewhat larger than the holes 15a. The drain 13 is equipped with a valve 16.

For the purpose of bringing the chloracetophenone in intimate contact with the solvent medium for the impurities, as for example naphtha, there is provided an agitator 17 mounted on the hollow agitator shaft 18, which is closed at the bottom, said hollow shaft having extending therein a thermometer 19. The conduit 1 may be provided with a sight glass 20.

The storage vessel B is provided with a steam inlet 21 for the steam jacket 22, and a steam outlet 23. The venting takes place through the conduit 24. 28 is an inlet member.

Between the residual solvent tank C and the vacuum line 5 is a solvent condenser 25. The tank C is provided with an outlet 26 connected to a source of vacuum, and with a draw off conduit 27 for the condensed solvent.

The general operation of the apparatus above set forth is as follows. A light petroleum distillate which may be normal hexane or mixed hexanes, or any other paraffin hydrocarbon of the character herein described, is introduced into the jacketed purifying kettle A which is provided with a closed cover and the agitator 17. Cold water or any other cooling medium is introduced through pipe 7 into jacket 6 of the kettle, and leaves through pipe 9. In this manner, the light petroleum distillate, herein termed naphtha, is kept cooled. After starting the agitator 17, the impure molten chloracetophenone is introduced through the heated conduit 1 into the naphtha or solvent medium.

When the desired quantity of chloracetophenone has been introduced, the flow thereof is shut off, whereupon the temperature is reduced to a point where there will be little or no tendency for the crystals of chloracetophenone present in the kettle to become sticky in the presence of the naphtha. For example, the temperature may be reduced to about 15° C. or even 0° C. Temperatures below 15° C. slightly reduce the solubility of the chloracetophenone in the solvent medium for the impurities, but since the solubility of chloracetophenone in the solvent medium is low, from a practical standpoint there is little to be gained by reducing the temperature below 15° C., although this may be done, if it is desired to recover a slightly greater amount of chloracetophenone. When solvents other than the paraffin hydrocarbons are used, it may be desirable to use a lower temperature in order to reduce the solubility of the chloracetophenone in the solvent medium for the impurities. After chloracetophenone has been introduced into the purifying kettle A, the valve 16 on the naphtha drain line 13 is opened, compressed gas is introduced through the pipe 3, and the bulk of the purifying solvent or naphtha is forced out through the fine mesh screen 15, which is supported on the metal disk 14 drilled with small holes. Thereafter, the valve 16 is closed.

After reducing the inside pressure to atmospheric by venting through vent line 4, the cold water is shut off, and all cold water in the jacket is drained out through the jacket drain 10, after which the drain valve is closed and warm water is introduced into the jacket 6 through the warm water inlet 8. The kettle A is evacuated through vacuum line 5 by means of a vacuum applied at the vacuum connection 26. The vapors are drawn through the conduit 25, and the condensed naphtha or solvent purifying medium is collected in tank C.

The temperature in the kettle A is then increased to facilitate the removal of the solvent purifying medium or naphtha from the crystals of chloracetophenone. Usually the temperature is increased to about 40°, but this is merely illustrative. The criterion is that the temperature should be raised to assist in the removal of the residual solvent purifying medium, as for example naphtha, but that the temperature should not be so high as to exert a tendency for the crystals of chloracetophenone to stick together and/or form a cake on the walls of the vessels. About 40° is as high as it is practical to go when operating under the conditions above set forth, it being again pointed out that the crystallizing temperature of chloracetophenone is in the neighborhood of about 54° C. Lower temperatures of operation at this point may be used, but it would take longer to remove the residual solvent purifying medium, as for example the naphtha, and the naphtha may not be completely removed. Of course, if the pressure inside the kettle is proportionately reduced, then somewhat lower temperatures may be just as effective. Further, at the same inside kettle pressure, lower temperatures may be used, providing the solvent purifying medium, as for example the petroleum distillate used, has a somewhat lower distilling range. By using a hydrocarbon or hydrocarbon mixture, the boiling point of which is below normal temperature, it may be unnecessary to reduce the inside kettle pressure below that of the atmosphere. The above clearly indicates that from a functional standpoint, the temperature should be increased to such a point which will insure the separation of the residual naphtha or other solvent purifying medium used, while at the same time preventing any tendency for the purified crystals of chloracetophenone sticking together, or sticking to the wall of the kettle.

The temperature in the kettle A having been increased to about 40° C., this temperature is maintained, as is the pressure, until suitable tests indicate practically complete removal of the naphtha. At this point, the warm water in the jacket is replaced with cold water, and the kettle temperature is reduced to about 25° C. while continuing the vacuum and stirring. The vacuum is then shut off, and the pressure inside the kettle A allowed to increase to that of the atmosphere by means of the vent pipe 4. A suitable container such as a drum is then placed under the products discharge outlet 11, the closure member 12 removed, and the purified crystals allowed to discharge into the container, the agitator 17 functioning to assist in accelerating the removal of the crystals of chloracetophenone. When the product has been all discharged, the removal plate is again put in place and the cycle is repeated. The product obtained is of high purity, is free flowing, white in color, substantially anhydrous, and almost completely free of acid.

The following examples are illustrative of the present invention. It is to be understood that they are presented by way of illustration and not by way of limitation:

*Example I*

514 parts naphtha were introduced through pipe 2 into a kettle typified by kettle A, whereupon 150 parts of molten impure chloracetophenone was allowed to flow in slowly through conduit 1, while stirring by means of agitator 17, and cooling by allowing cold water to enter the jacket 6 at cold water inlet 7, circulate through the jacket 6, and then emerge at outlet 9. After all the chloracetophenone has been introduced, the temperature is increased to and maintained at about 35° C. for about one hour. This was accomplished by closing the cold water valve, draining the kettle jacket through drain pipe 10, and introducing the warm water at warm water inlet 8. The warm water was shut off, the jacket drained, and cold water introduced into the jacket to reduce the temperature to about 15° C. The naphtha containing the impurities was drained away through separator 13, whereupon 257 parts of fresh naphtha was introduced through pipe 2. The slurry was again warmed to and maintained at 35° C. for about one-half hour, after which the temperature was reduced to about 15° C. and the bulk of the naphtha again drained away. All openings on the purifying kettle A except the vacuum line 5 were tightly closed, and while continuing to stir; the inside pressure was first reduced to 120 mm. of mercury through vacuum line 5, while the contents of the vessel were again warmed by circulating water through the jacket 6. Thereafter, the inside pressure was further reduced to 12.5 mm. of mercury, and this was maintained for about two hours. The pressure inside the kettle A was then increased to atmospheric pressure by means of vent pipe 4, after having first closed the valve on vacuum line 5, after which the chloracetophenone was discharged through the products discharge outlet 11 after disconnecting the removable closure member 12. 129.5 parts of very pure free flowing chloracetophenone was obtained. Additional quantities of chloracetophenone may be recovered from the naphtha which was drained away.

*Example II*

1064 parts of naphtha were charged through solvent inlet conduit 2 into the jacketed kettle A; and while stirring with agitator 17 and cooling by circulating cold water through the jacket 6, 405.5 parts of impure molten chloracetophenone was allowed to flow in from storage vessel B through conduit 1 to purifying kettle A, allowing the temperature to rise to 25° C. towards the end of the delivery period. After stirring for a few minutes, the temperature was reduced to 15° C., whereupon the bulk of the naphtha containing most of the impurities was removed by flowing through separator 13. The rate of flow was accelerated by compressed gas introduced through conduit 3, said gas having been introduced after closing all other openings except the one on the drain line 13. At this point, after closing the valves on pipe 3 and drain line 13, the pressure was reduced to atmospheric by venting through vent pipe 4, the valve on which was then closed, after which, by means of conduit 5, the inside pressure in the kettle A was reduced to 2 or 3 inches of mercury by connecting to a source of vacuum at 26. At the same time, the cold water in the jacket 6 was replaced by warm water by suitable adjustment of the valves, thereby increasing the temperature inside the kettle A to about 40° C., which conditions were maintained until substantially all the naphtha was removed. The temperature inside the kettle A was then reduced to about 25° C. by replacing the warm water in the jacket with cold water, and the vacuum was then released from the kettle. The resulting chloracetophenone, which was very pure and free flowing, was then discharged and amounted to 360 parts.

To those skilled in the art, it will be apparent that certain modifications may be made, and therefore the examples should be considered as illustrative and not limiting the scope of the invention to the specific details thereof. For example, it is desired to point out that the impure chloracetophenone may first be granulated, and the resulting crystals mixed with the solvent purifying medium, as for example naphtha. After stirring the resulting slurry for a period of time, the bulk of the naphtha is separated as hereinbefore set forth, the remainder of the procedure being essentially the same as described. It is desired to point out that the chloracetophenone may be mixed with the naphtha in any manner in which purification of the chloracetophenone will be effected, as for example by adding molten chloracetophenone to the cool naphtha or solvent purifying medium in such a manner that crystals are formed, or by adding previously granulated chloracetophenone to the naphtha, preferably while stirring to produce crystals which are small because in general the smaller crystals will be somewhat purer. Thereafter, the bulk of the naphtha may be removed in the manner already outlined, or it may be separated from the crystals by filtering or centrifuging, and subsequently drying in a suitable manner to remove all of the naphtha. The chloracetophenone may be recovered in crystal form, or any other solid form, or as a liquid. While these variations may be proposed in accordance with the broad invention herein set forth, it is desired to point out that the purification in a vessel of the character set forth and under the operating conditions set forth is more economical, convenient and satisfactory, and represents the preferred form of the invention.

The passage of the solvent purifying medium, as for example naphtha, through the separator 13 is, as pointed out, accelerated by applying pressure by means of a suitable gas above the slurry in the purifying kettle. The gas may consist of air, nitrogen, carbon dioxide, hydrocarbon gases including methane, or mixtures thereof. These are merely illustrative, and this feature of the invention is not limited to any particular kind of gas except that it must not react chemically with any of the other materials present or have a deleterious action on the product. Oxygen involves some explosion hazard, and, therefore, it should not be used. However, air has been successfully used as the gaseous agent or medium for accelerating the removal of the solvent from the treated solid particles of chloracetophenone. Hydrocarbons are less desirable because they are soluble in the naphtha or other medium used. The rare gases such as argon and helium may be used, but are expensive.

Referring to Example I, the pressure inside the kettle A was first reduced to 120 mm. of mercury, because relatively speaking there is a large volume of naphtha present in the kettle, and it is not desirable or feasible as a general rule to reduce the pressure to a lower value. Later, when the naphtha is largely removed, the inside pressure is further reduced to facilitate removal of the residual naphtha from the crystals. The lower pressure, and warming and stirring of the crystals are continued as herein set forth until suitable tests indicate that the naphtha has been substantially all removed. This may require two hours or six or eight hours, the time varying with the type of chloracetophenone crystal, the quantity of crystals present, the distilling range of the solvent purifying medium, and other less understood factors.

The most practical classes of solvent media used to extract the impurities from the chloracetophenone are the lower or medium boiling point paraffins and the olefins, since these classes of organic hydrocarbon compounds dissolve comparatively small amounts of chloracetophenone while efficiently removing the impurities present. It is, of course, possible to use other solvents, such as alcohols, any of the aromatic solvent hydrocarbons, and any of the chlorinated aliphatic hydrocarbons, but since chloracetophenone is quite soluble therein, they are less desirable and the recovery is less. Subject to the above, the following are representative solvents which may be used in carrying out the present invention:

A. *Paraffins.*—N-pentane, 2,2-dimethylbutane, 3-methylpentane, N-pentane, 2,2-dimethylpentane, 2,4-dimethylpentane, N-heptane, 2,2,4-trimethylpentane, 3-methylheptane, N-octane, 2,2,5-trimethylhexane;

B. *Olefins.*—2-methylbutene-2, 2,2-dimethylbutene-3, hexene-3, 2,2-dimethylpentene-4, heptene-1, 2,4,4-trimethylpentene-1, 2,4,4-trimethylpentene-2, 2,3,3,4-tetramethylpentene-1, and 2,5-dimethylheptene-2;

C. *Alcohols.*—Methyl alcohol, ethyl alcohol, propyl alcohol, i-propyl alcohol, and butyl alcohol;

D. *Chlorinated hydrocarbons.*—Carbon tetrachloride, monochlorbenzene, ethylene dichloride, propyl chloride, and butyl chloride.

While any of the above solvents may be used, particularly good results are obtained by using a light petroleum distillate consisting of a mixture of paraffin hydrocarbons, including some pentane, some hexane, heptanes, some octanes, and some nonanes.

What I claim is:

1. The method of purifying chloracetophenone containing impurities including a small percentage of hydrogen chloride and acetophenone, comprising treating the chloracetophenone with an organic treatment-medium selected from the group consisting of paraffin and olefin hydrocarbons having a boiling point below 137° C., said treatment-medium dissolving a negligible quantity of the chloracetophenone and substantially dissolving the impurities present therein, maintaining said organic treatment medium at a temperature which keeps the chloracetophenone in a solid, divided form, separating the hydrocarbon treatment-agent carrying the impurities from the purified chloracetophenone, and recovering the latter.

2. The method of purifying chloracetophenone containing impurities including a small percentage of hydrogen chloride and acetophenone, comprising treating the chloracetophenone with a paraffin hydrocarbon normally liquid at atmospheric pressure and at a temperature varying between about 45° C. and about 120° C., said hydrocarbon dissolving a negligible quantity of the chloracetophenone and substantially dissolving the impurities present therein, maintaining said hydrocarbon at a temperature which keeps the chloracetophenone in a solid, divided form, separating the hydrocarbon treatment-agent carrying the impurities from the purified chloracetophenone, and recovering the latter.

3. The method of purifying chloracetophenone containing impurities including a small percentage of hydrogen chloride and acetophenone, comprising treating the chloracetophenone with an olefin hydrocarbon having a boiling point below 137° C., said hydrocarbon dissolving a negligible quantity of the chloracetophenone and substantially dissolving the impurities present therein, maintaining said hydrocarbon at a temperature which keeps the chloracetophenone in a solid, divided form, separating the hydrocarbon treatment-agent carrying the impurities from the purified chloracetophenone, and recovering the latter.

4. The method of purifying chloracetophenone containing impurities including a small percentage of hydrogen chloride and acetophenone comprising treating under at least atmospheric pressure chloracetophenone with a cool hydrocarbon treatment-medium selected from the group consisting of paraffin and olefin hydrocarbons having a boiling point below 137° C., said hydrocarbon dissolving a negligible quantity of chloracetophenone and substantially dissolving the impurities present therein, maintaining said hydrocarbon in a cool state which keeps the chloracetophenone in a solid, divided form, applying a gas pressure greater than atmospheric to the resulting mass to assist in the separation of the bulk of the hydrocarbon treatment-agent, reducing said pressure, separating the bulk of the hydrocarbon-treatment-agent carrying the impurities, applying a vacuum to the remaining chloracetophenone, heating the resulting relatively cool chloracetophenone to a temperature facilitating the removal of the residual hydrocarbon treatment-agent while inhibiting sticking together of the divided, solid particles of chloracetophenone, and recovering the latter.

5. The method of purifying chloracetophenone containing impurities including a small percentage of hydrogen chloride and acetophenone, comprising treating the chloracetophenone with petroleum naphtha having a boiling point between about 43° C. and about 137° C., said naphtha dissolving a negligible quantity of the chloracetophenone and substantially dissolving the impurities present therein, maintaining the naphtha at a temperature which keeps the chloracetophenone in a solid, divided form, separating the naphtha carrying the impurities from the purified chloracetophenone, and recovering the latter.

6. The method of purifying chloracetophenone containing impurities including a small percentage of hydrogen chloride and acetophenone comprising treating under at least atmospheric pressure chloracetophenone with a cool hydrocarbon treatment-medium selected from the group consisting of paraffin and olefin hydrocarbons having a boiling point below 137° C., said hydrocarbons dissolving a negligible quantity of chloracetophenone and substantially dissolving the impurities present therein, maintaining said hydrocarbons at a temperature below about 15° C. which keeps the chloracetophenone in a solid, divided form, applying a gas pressure greater than atmospheric to the resulting mass to assist in the separation of the bulk of the hydrocarbon treatment-agent, reducing said pressure, separating the bulk of the hydrocarbon treatment-agent carrying the impurities, applying a vacuum to the remaining chloracetophenone, heating the resulting relatively cool chloracetophenone to a temperature facilitating the removal of the residual hydrocarbon treatment-agent, the upper limit of said temperature being 40° C., whereby sticking together of the divided, solid particles of chloracetophenone is inhibited, and recovering the latter.

7. The method of purifying chloracetophenone containing impurities including a small percentage of hydrogen chloride and acetophenone, comprising treating the chloracetophenone with an organic treatment-medium selected from the group consisting of paraffin and olefin hydrocarbons having a boiling point below 137° C., said treatment-medium dissolving a negligible quantity of the chloracetophenone and substantially dissolving the impurities present therein, maintaining said organic treatment-medium at a temperature which keeps the chloracetophenone in a solid, divided form, separating the bulk of the hydrocarbon treatment-medium containing said impurities from the chloracetophenone, subjecting the so-treated chloracetophenone to vacuum distillation to remove residual treatment-medium while maintaining the chloracetophenone at a temperature below the fusion point thereof, and recovering purified chloracetophenone.

8. The method of purifying chloracetophenone containing impurities including a small percentage of hydrogen chloride and acetophenone, comprising treating the chloracetophenone with an organic treatment-medium selected from the group consisting of paraffin and olefin hydrocarbons having a boiling point below 137° C., said treatment-medium dissolving a negligible quantity of the chloracetophenone and substantially dissolving the impurities present therein, maintaining said organic treatment medium at a temperature which keeps the chloracetophenone in a solid, divided form, separating the bulk of the hydrocarbon treatment medium containing said impurities from the chloracetophenone, while maintaining the resulting slurry of treatment medium and chloracetophenone under a pressure greater than atmospheric, subjecting the so-treated chloracetophenone to a vacuum distillation to remove residual treatment medium while maintaining the chloracetophenone at a temperature below the fusion point thereof, and recovering purified chloracetophenone.

WILLIAM M. LOFTON, Jr.